May 31, 1927.

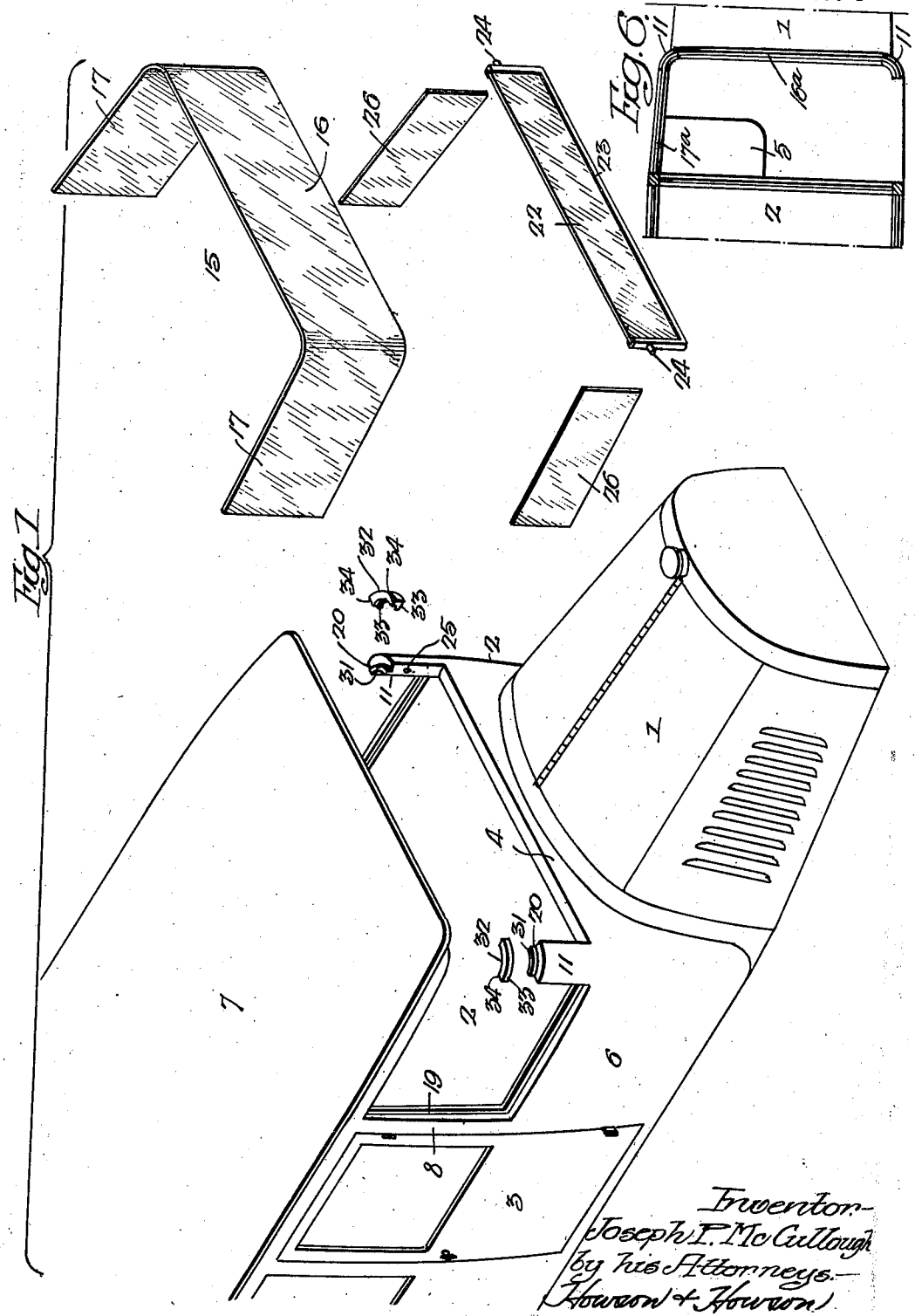

J. P. McCULLOUGH

AUTOMOBILE WINDSHIELD

Filed Jan. 29, 1926

Inventor:—
Joseph P. McCullough
by his Attorneys.—
Howson & Howson

Patented May 31, 1927.

1,631,046

UNITED STATES PATENT OFFICE.

JOSEPH P. McCULLOUGH, OF PHILADELPHIA, PENNSYLVANIA, ASSIGNOR OF THIRTY-THREE PER CENT TO JOSEPH M. EVANS, OF CAMDEN, NEW JERSEY, AND THIRTY-TWO PER CENT TO WALTER H. CONARD, OF PHILADELPHIA, PENNSYLVANIA.

AUTOMOBILE WINDSHIELD.

Application filed January 29, 1926. Serial No. 84,671.

My invention relates to automobile wind shields and more particularly to those employed in the enclosed or sedan type automobile body.

The principal object of my invention is to eliminate the so called blind area within the driver's range of vision, caused by the heavy door, door frame and wind shield mounting common to the closed car.

My invention provides for the elimination of the above noted objectionable heavy construction at the front of the automobile and allows a clear range of vision for the driver of the car, from a point adjacent the back of driver's seat and extending forward to and across the entire front of the machine and rearward along the side opposite the driver's seat to a point adjacent the back of the passenger's seat located at the side of the driver's seat.

Other advantages and the detailed construction of my invention will be more fully described hereinafter, being clearly illustrated in the accompanying drawings wherein:

Fig. 1 is a detached perspective view of the preferred form of my invention;

Fig. 6 is a plan view of a modified form of the invention.

Figure 5:
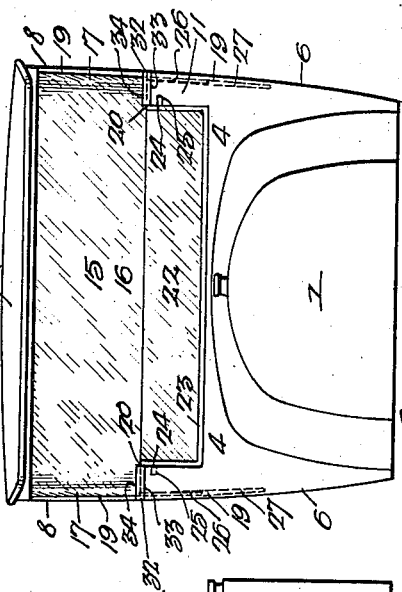
Fig. 5 is a front elevation of an enclosed automobile body, embodying the principles of my invention.

As illustrated in the drawings 1 is the hood of the automobile, 2 is the body located at the rear of the hood and provided with doors 3, 3. 4 is the front of the car body. 5 is the front seat of the car adapted to accommodate the driver and a passenger.

The car body is provided with the usual lower portion 6 and roof 7, said roof being supported in the present instance by upright members 8, 8 located adjacent the back portion of the front seat of the car. The portion of the roof extending forward of the supporting uprights 8, 8 to a point above the front 4 of the body is reinforced by a transverse member 9 and a pair of diagonal brace members 10, 10 which extend from the upper ends of the uprights 8, 8 at an angle forwardly to a point at the centre of the top 7 directly above the front 4.

The car body is provided with corner members 11, 11 which extend upward from the lower side portions 6 at their point of juncture with the front portion 4, to a point above the top of the hood 1 but below the range of vision of the driver.

Between the top of the corner members 11, 11 and the under side of the roof 7 I place my improved wind shield 15 which comprises a front plate 16 and side wings 17, 17 which extend rearwardly to the upright members 8, 8. My wind shield is formed from a single piece of glass or other transparent material, bent substantially at right angles adjacent its ends to form the side wings 17, 17.

The under side of the roof 7 is provided with a groove 18, formed in any suitable manner, into which the upper edge of the wind shield 15 projects. The upright members 8, 8 are provided with suitably formed grooves 19, 19 which align with the groove 18 at their upper ends and each provide a support for the upright edge of the respective wing members 17, 17. The grooves 19, 19 extend downward to and below the upper edge of the lower portion 6 of the body.

The upper face of the corner members 11, 11 are likewise each provided with a suitably formed groove 20, adapted to receive the rounded portion of the wind shield 15, formed at the juncture of the front plate 16 and the side wings 17, 17.

The space defined by the lower edge of the front plate 16, the corner members 11, 11, and the top edge of the front 4, is closed by means of a pivoted wind shield section 22 comprising a frame 23 provided with trunnions 24, 24 adapted to sockets 25 in the corner members 11, 11. Such pivoted section provides means whereby ventilation of the interior of the car may be accomplished.

The space, on each side of the car, defined by the lower edge of the side wing 17, the forward edge of the upright 8, the rear edge of the corner member 11 and the upper edge of the lower portion 6 of the body, is closed by a plate 26 adapted to slide in the groove 19 below the wing 17 and in a groove 27 suitably formed in the rear edge of the corner member 11. The upper edge of the lower portion 6 is slotted to permit the plate 26 to be lowered into the said body portion, for the purpose of ventilation or signaling well known to automobile drivers.

The upright members 8, 8 are each adapted to form one side of the frame of the respective doors 3, 3.

From the above description it will be apparent that I provide a wind shield which presents an absolutely clear range of vision for the driver of the car embodying my invention.

Figure 4:
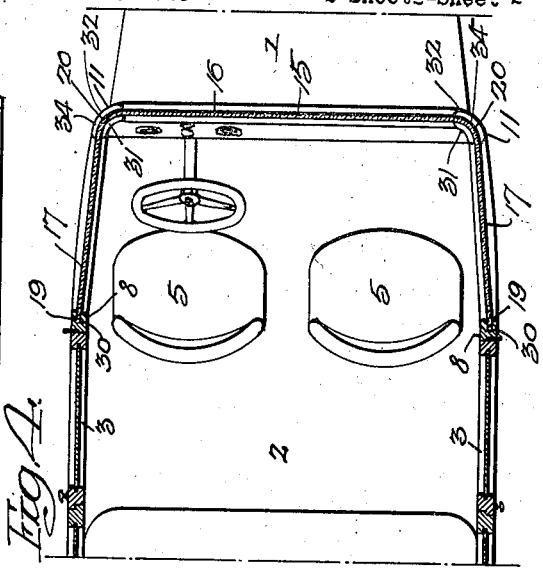
Fig. 4 is a sectional plan view taken on the line 4—4 of Fig. 2.
Figure 2:
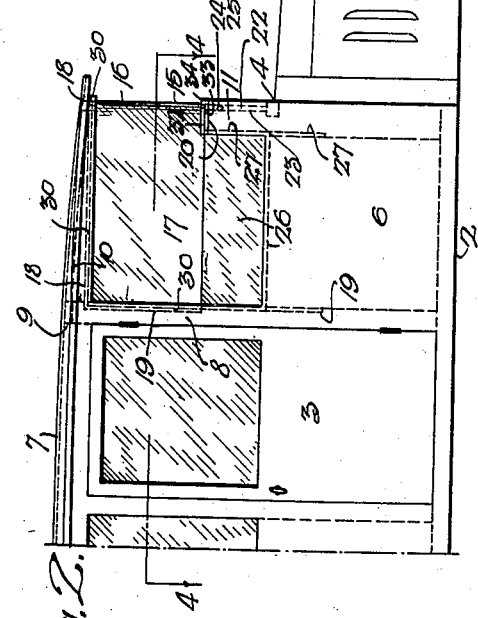
Fig. 2 is a side elevation of the invention.
Figure 3:
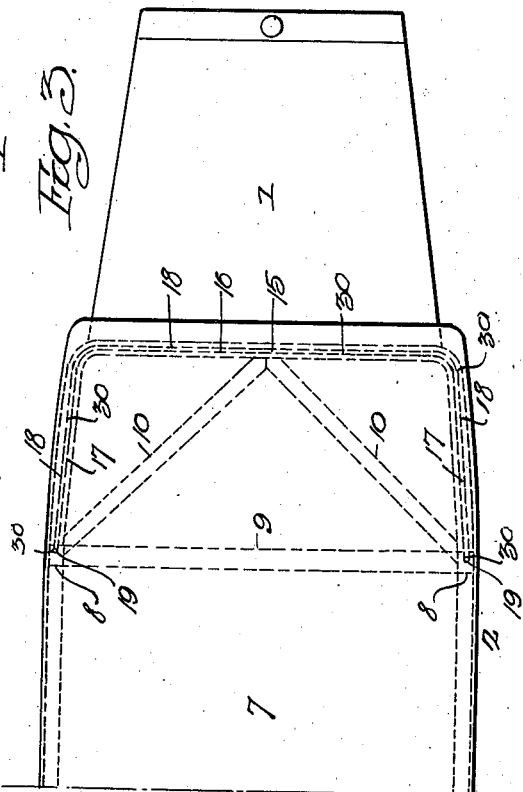
Fig. 3 is a plan view.

The grooves 18 and 19 are provided with suitable cushioning means, such as a strip of rubber 30, Fig. 4, positioned between base of the groove and the edge of the wind shield respectively.

The groove 20 in the upper face of each of the corner posts 11, 11 comprises an inner wall 31 and a removable element 32 preferably formed of resilient material such as rubber. The element 32 comprises a base section 33 and a wall section 34 integral with said base section and may be secured to the corner post 11 in any suitable manner.

The base section 33 extends under the lower edge of the wind shield 15 at the curved intersection of the front plate 16 and the side wing 17 at each side of the wind shield and provides a cushion therefor on the respective corner post 11.

The wall section 34 extends upward from the base section 33 and provides the second retaining wall of the groove 20.

The wind shield may be removed from the car body by extracting the elements 32 from beneath the said wind shield and thereafter lowering it until its upper edge is free of the groove 18 in the top 7, whereupon it may be moved forward out of the groove 19 in each of the supports 8, 8.

In some instances the wind shield may be formed of a front plate 16ª, Fig. 6 and a single wing 17ª adjacent the driver's seat, the opposite side being open and free to permit ingress and egress, as in the case of a taxi cab where the driver is outside the passenger compartment of the car.

I claim:

1. An automobile body comprising lower side portions; a front portion; corner members at the juncture of said front and side portions; upright supporting members extending above said lower side portions and spaced to the rear of said corner members; a one piece wind shield comprising a front plate and side wings, spaced above said lower side portions and said front portion; a movable wind shield section below said front plate between said corner members, and movable wind shield sections below said side wings, between said corner members and said upright supporting members.

2. An automobile body comprising lower side portions; a front portion; a one piece wind shield comprising a front plate and side wings rigidly supported above and substantially aligned with said front portion and said lower side portions, and movable wind shield sections between said rigidly supported one piece wind shield and the upper edges of said front and said lower side portions.

3. An automobile body comprising lower side portions; a front portion; a roof; supporting members for said roof; a transversely extending brace member for said roof; diagonal brace members for said roof adapted to stiffen said roof forward of said supporting members; and a one piece wind shield extending forwardly from said supporting members and across the front of said automobile body, between said roof and said lower side portions and said front portion.

4. An automobile body comprising side portions, a front portion and an overhanging roof; short front corner posts, a U-shaped one piece transparent wind shield resting on the corner posts and located under the overhanging roof.

5. An automobile body comprising side portions, a front portion and an overhanging roof; short front corner posts, a U-shaped one piece transparent wind shield resting on the corner posts and located under the overhanging roof; cushions on the corner posts; and cushions on the overhanging roof and detachable means on the corner posts for securing the wind shield to the posts.

JOSEPH P. McCULLOUGH.